United States Patent
Patil et al.

(10) Patent No.: US 12,463,295 B2
(45) Date of Patent: Nov. 4, 2025

(54) CYLINDRICAL CELL-BASED PARAMETRIC BATTERY MODULE FOR FLEXIBLE ASSEMBLY AND PACKAGING

(71) Applicant: GM GLOBAL TECHNOLOGY OPERATIONS LLC, Detroit, MI (US)

(72) Inventors: Chinmaya Patil, South Lyon, MI (US); Venkata Prasad Atluri, Novi, MI (US); Teresa U. Holiness-Stalling, Detroit, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 604 days.

(21) Appl. No.: 17/887,996

(22) Filed: Aug. 15, 2022

(65) Prior Publication Data
US 2024/0055733 A1    Feb. 15, 2024

(51) Int. Cl.
*H01M 50/512* (2021.01)
*H01M 50/213* (2021.01)
*H01M 50/507* (2021.01)
*H01M 50/547* (2021.01)
*H01M 50/553* (2021.01)

(52) U.S. Cl.
CPC ....... *H01M 50/512* (2021.01); *H01M 50/213* (2021.01); *H01M 50/507* (2021.01); *H01M 50/547* (2021.01); *H01M 50/553* (2021.01)

(58) Field of Classification Search
CPC ............. H01M 50/512; H01M 50/507; H01M 50/547; H01M 50/553; H01M 50/213
See application file for complete search history.

(56) References Cited

U.S. PATENT DOCUMENTS

| | | | | |
|---|---|---|---|---|
| 5,662,497 A | * | 9/1997 | Reilly ................. | H01R 11/288 439/627 |
| 10,008,704 B2 | * | 6/2018 | Sweney .............. | H01M 50/394 |
| 2008/0286637 A1 | * | 11/2008 | Yusa ................... | H01M 50/179 429/99 |
| 2012/0301762 A1 | * | 11/2012 | Welker ................ | H01M 50/503 429/99 |
| 2014/0154530 A1 | * | 6/2014 | Fujiwara ............. | H01M 50/512 429/7 |
| 2017/0033419 A1 | * | 2/2017 | Eom ................... | H01M 10/647 |
| 2021/0066683 A1 | * | 3/2021 | Lane ................... | H01M 10/653 |
| 2022/0393485 A1 | * | 12/2022 | Kamel Ahmed ... | H01M 10/441 |

FOREIGN PATENT DOCUMENTS

WO    WO-2012128680 A1 *  9/2012 ............. A01G 3/053

OTHER PUBLICATIONS

U.S. Appl. No. 17/888,025, filed Aug. 15, 2022, Patil et al.
U.S. Appl. No. 17/888,058, filed Aug. 15, 2022, Atluri et al.

\* cited by examiner

*Primary Examiner* — Matthew J Merkling

(57) ABSTRACT

A battery module includes: a positive terminal disposed on an exterior of a housing of the battery module; a negative terminal disposed on the exterior of the housing of the battery module; groups of two or more cylindrical battery cells electrically connected in parallel; and electrically conductive bus bars that electrically connect the groups in series, that electrically connect positive terminals of the cylindrical battery cells of a first one of the groups with the positive terminal of the battery module, and that electrically connect negative terminals of the cylindrical battery cells of a second one of the groups with the negative terminal of the battery module.

20 Claims, 18 Drawing Sheets

CYLINDRICAL CELL-BASED PARAMETRIC BATTERY MODULE FOR FLEXIBLE ASSEMBLY AND PACKAGING

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to energy storage devices and more particularly to battery packs, modules, and cells for vehicles.

Some types of vehicles include only an internal combustion engine that generates propulsion torque. Electric vehicles may not include an internal combustion engine and may rely on one or more electric motors for propulsion.

Hybrid vehicles include both an internal combustion engine and one or more electric motors. Some types of hybrid vehicles utilize the electric motor and the internal combustion engine in an effort to achieve greater fuel efficiency than if only the internal combustion engine was used. Some types of hybrid vehicles utilize the electric motor and the internal combustion engine to achieve greater torque output than the internal combustion could achieve by itself.

Some example types of hybrid vehicles include parallel hybrid vehicles, series hybrid vehicles, and other types of hybrid vehicles. In a parallel hybrid vehicle, the electric motor works in parallel with the engine to combine power and range advantages of the engine with efficiency and regenerative braking advantages of electric motors. In a series hybrid vehicle, the engine drives a generator to produce electricity for the electric motor, and the electric motor drives a transmission. This allows the electric motor to assume some of the power responsibilities of the engine, which may permit the use of a smaller and possibly more efficient engine.

SUMMARY

In a feature, a battery module includes: a positive terminal disposed on an exterior of a housing of the battery module; a negative terminal disposed on the exterior of the housing of the battery module; groups of two or more cylindrical battery cells electrically connected in parallel; and electrically conductive bus bars that electrically connect the groups in series, that electrically connect positive terminals of the cylindrical battery cells of a first one of the groups with the positive terminal of the battery module, and that electrically connect negative terminals of the cylindrical battery cells of a second one of the groups with the negative terminal of the battery module.

In further features: the positive terminals of all of the cylindrical battery cells of the groups are disposed on a first plane and face a first direction; and the negative terminals of all of the cylindrical battery cells of the groups are disposed on a second plane that is parallel to the first plane and face a second direction that is opposite the first direction.

In further features, the groups of two or more cylindrical battery cells form a rectangle shape.

In further features, the electrically conductive bus bars include electrically conductive bus bars that extend between two of the groups and that electrically connect the negative terminals of a first one of the two groups with the positive terminals of a second one of the two groups.

In further features: the positive terminal of the battery module is disposed on a first side of the battery module; the negative terminal of the battery module is disposed on a second side of the battery module; and the second side is opposite the first side.

In further features, the groups of two or more cylindrical battery cells form a square shape.

In further features, the electrically conductive bus bars include electrically conductive bus bars that extend between two of the groups and that electrically connect the negative terminals of a first one of the two groups with the positive terminals of a second one of the two groups.

In further features: the positive terminal of the battery module is disposed on a first side of the battery module; and the negative terminal of the battery module is disposed on the first side of the battery module.

In further features: the positive terminals of a first portion of the cylindrical battery cells of the groups are disposed on a first end of the cylindrical battery cells; the positive terminals of a second portion of the cylindrical battery cells of the groups are disposed on a second end of the cylindrical battery cells that is opposite the first end; the negative terminals of the first portion of the cylindrical battery cells of the groups are disposed on the second end of the cylindrical battery cells; and the negative terminals of the second portion of the cylindrical battery cells of the groups are disposed on the first end of the cylindrical battery cells.

In further features, the groups of two or more cylindrical battery cells form a rectangle shape.

In further features, the electrically conductive bus bars include electrically conductive bus bars that extend between two of the groups and that electrically connect the negative terminals of a first one of the two groups with the positive terminals of a second one of the two groups.

In further features: the positive terminal of the battery module is disposed on a first side of the battery module; the negative terminal of the battery module is disposed on a second side of the battery module; and the second side is opposite the first side.

In further features, the groups of two or more cylindrical battery cells form a square shape.

In further features, the electrically conductive bus bars include electrically conductive bus bars that extend between two of the groups and that electrically connect the negative terminals of a first one of the two groups with the positive terminals of a second one of the two groups.

In further features: the positive terminal of the battery module is disposed on a first side of the battery module; and the negative terminal of the battery module is disposed on the first side of the battery module.

In a feature, a battery pack includes: at least two of the above battery modules; and electrical conductors electrically connecting the at least two battery modules in series; where the positive terminals of the at least two battery modules are arranged on first sides of the at least two battery modules, respectively; where the negative terminals of the at least two battery modules are arranged on second sides of the at least two battery modules, respectively, where the second sides of the at least two battery modules are opposite the first sides of the respective at least two battery modules.

In further features, a first one of the at least two battery modules is disposed on top of a second one of the at least two battery modules.

In further features, a first one of the at least two battery modules is disposed beside a second one of the at least two battery modules.

In a feature, a battery pack includes: at least two of the above battery modules; and electrical conductors electrically connecting the at least two battery modules in series; where the positive terminals of the at least two battery modules are arranged on first sides of the at least two battery modules, respectively; and where the negative terminals of the at least two battery modules are arranged on the first sides of the at least two battery modules, respectively.

In further features, a first one of the at least two battery modules is disposed beside a second one of the at least two battery modules.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A vehicle includes a battery pack that includes two or more battery modules. Each battery module includes a plurality of battery cells, such as cylindrical battery cells. The cell to cell and module to module electrical connections provides manufacturing line efficiency by accommodating multiple different configurations and shapes of cylindrical battery cell groups and multiple different module connection options while minimizing interconnect electrical resistance and minimizing battery module and battery pack mass and volume.

The present application is applicable to multiple different battery cell sizes and different numbers of battery cells connected in series and/or in parallel. Different module packing may be used, such as all modules on one plane (flat or side by side) or stacked on two or more planes. Electrical connectors (bus bars) within each battery module form different sizes and shapes of battery cell groups.

A thermal runaway protection (TRP) blanket is disposed over vents of the battery cells. The TRP blanket includes thinner sacrificial portions over the vents of the cells, respectively. The thinner sacrificial portion is configured to open when a battery cell experiences a thermal runaway event and ejects ejecta (e.g., liquid) out of its vent. The TRP blanket protects other battery cells of a battery module from the ejecta and minimizes heat transfer from the ejecta to the other battery cells. This minimizes a risk of other battery cells experiencing a thermal runaway event in response to one cell experiencing a thermal runaway event.

A cooling plate is also provided for the battery module to warm or cool the battery module. The cooling plate has one or more cooling channels configured to provide predetermined heat transfer characteristics at predetermined locations of the battery module. For example, the cooling channels may be configured to provide greater heat transfer at locations where higher temperatures occur within the battery module and to provide letter heat transfer at other locations where lower temperatures occur within the battery module.

Figure 1:
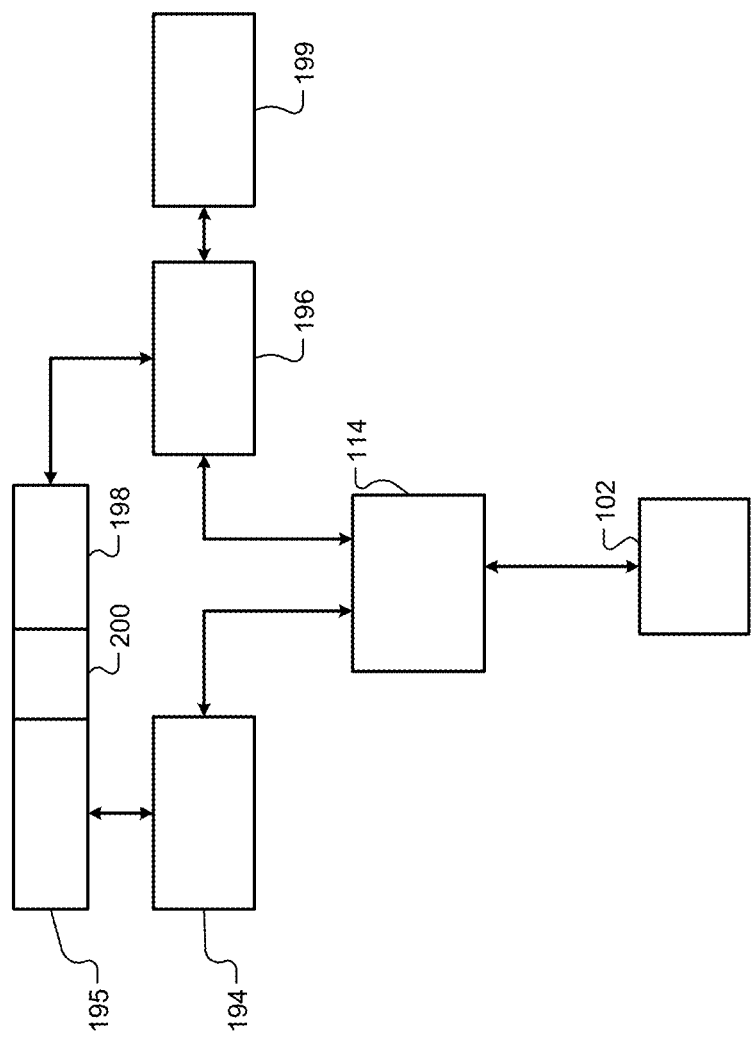
FIG. 1 is a functional block diagram of an example vehicle system.

Referring now to FIG. 1, a functional block diagram of an example vehicle system is presented. While a vehicle system for a hybrid vehicle is shown and will be described, the present disclosure is also applicable to electric vehicles that do not include an internal combustion engine (including pure electric vehicles), fuel cell vehicles, autonomous vehicles, semi-autonomous vehicles, non-autonomous vehicles, and other types of vehicles. Also, while the example of a vehicle is provided, the present application is also applicable to non-vehicle implementations.

An engine 102 may combust an air/fuel mixture to generate drive torque. An engine control module (ECM) 114 controls the engine 102. For example, the ECM 114 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators. In some types of vehicles (e.g., electric vehicles), the engine 102 may be omitted.

The engine 102 may output torque to a transmission 195. A transmission control module (TCM) 194 controls operation of the transmission 195. For example, the TCM 194 may control gear selection within the transmission 195 and one or more torque transfer devices (e.g., a torque converter, one or more clutches, etc.).

The vehicle system includes one or more electric motors, such as electric motor 198. An electric motor (also referred to as an electric machine) can act as either a generator or as a motor at a given time. When acting as a generator, an electric motor converts mechanical energy into electrical energy. The electrical energy can be, for example, used to charge a battery pack 199. When acting as a motor, an electric motor generates torque that may be used, for example, for vehicle propulsion. While the example of one electric motor is provided, the vehicle may include more than one electric motor.

A motor control module 196 controls power flow from the battery pack 199 to the electric motor 198 and from the electric motor 198 to the battery pack 199. The motor control module 196 applies electrical power from the battery pack 199 to the electric motor 198 to cause the electric motor 198 to output positive torque, such as for vehicle propulsion. As discussed further below, the battery pack 199 includes one or more battery modules, and each battery module includes a plurality of battery cells.

The electric motor 198 may output torque, for example, to an input shaft of the transmission 195 or to an output shaft of the transmission 195. A clutch 200 may be engaged to couple the electric motor 198 to the transmission 195 and disengaged to decouple the electric motor 198 from the transmission 195. One or more gearing devices may be implemented between an output of the clutch 200 and an input of the transmission 195 to provide a predetermined ratio between rotation of the electric motor 198 and rotation of the input of the transmission 195.

The motor control module 196 may also selectively convert mechanical energy of the vehicle into electrical energy. More specifically, the electric motor 198 generates and outputs power via back EMF when the electric motor 198 is being driven by the transmission 195 and the motor control module 196 is not applying power to the electric motor 198 from the battery pack 199. The motor control module 196 may charge the battery pack 199 via the power output by the electric motor 198.

Figure 2:
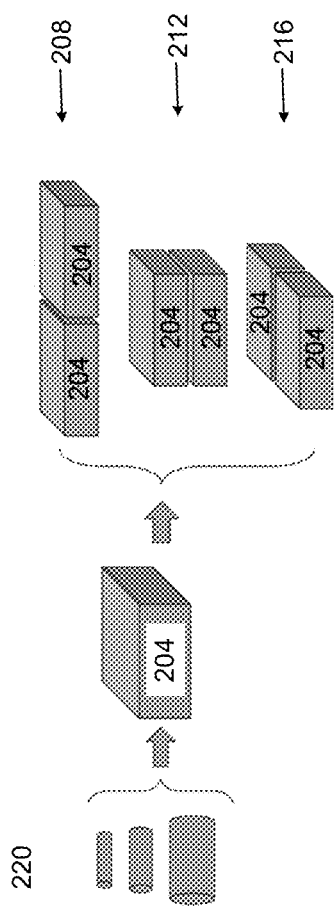
FIG. 2 is a functional block diagram of an example implementation of a battery pack.

FIG. 2 is a functional block diagram of an example implementation of the battery pack 199. As discussed above, the battery pack 199 includes 2 or more battery modules, such as battery module 204. The battery modules 204 can be arranged end to end as illustrated by 208, stacked on top of each other as illustrated by 212, and/or arranged side by side as illustrated by 216.

Each of the battery modules 204 include multiple battery cells. Example battery cells are illustrated by 220. The battery cells 220 may be cylindrical prismatic battery cells or another suitable type of battery cell, such as prismatic battery cells having another shape or pouch type battery cells. The battery cells 220 may include one or more different sizes of battery cells. Example different sizes of battery cells are illustrated in FIG. 2.

Figure 3B:
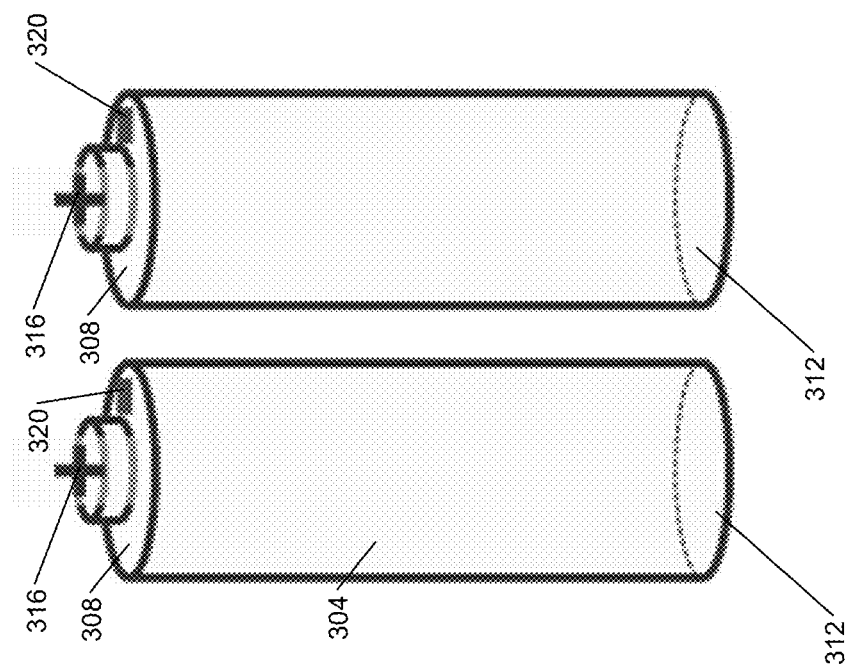
FIGS. 3A and 3B illustrate example orientations and types of battery cells.
Figure 3A:
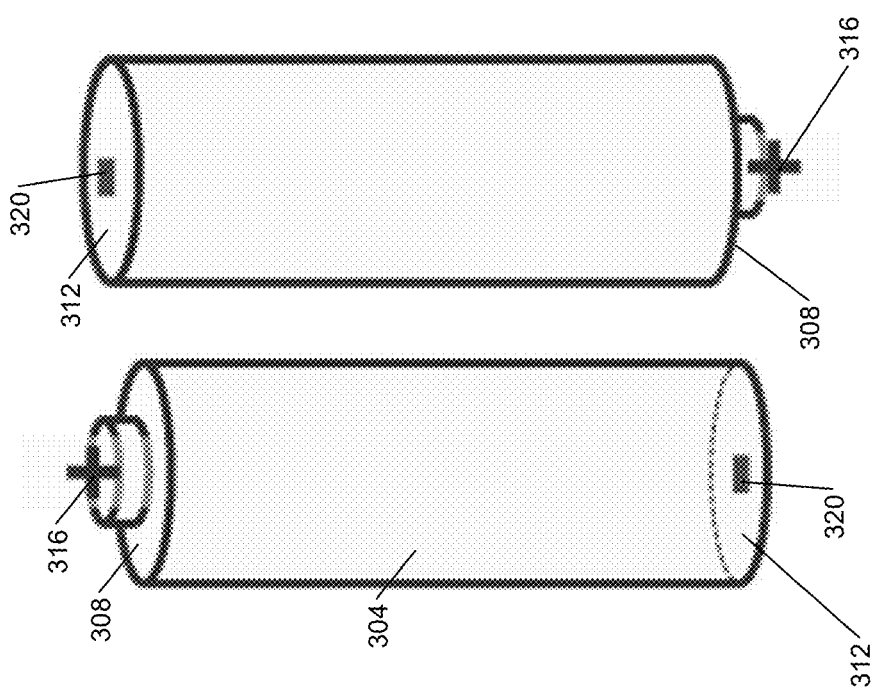

FIGS. 3A and 3B illustrate example orientations and types of battery cells. The battery cells 220 each include a side wall, such as a cylindrical shaped side wall 304. The battery cells 220 also each include a first face 308 and a second face 312 that is opposite the first face 308.

The battery cells 220 each have an electrically conductive positive terminal (or contact) 316 and an electrically conductive negative terminal (or contact) 320. As illustrated in FIG. 3A, the positive terminal 316 may be disposed on the first face 308 and the negative terminal 320 may be disposed on the second face 312. In various implementations, the positive terminal 316 may protrude from the first face 308. With this configuration, some (e.g., half) of the battery cells 220 may be oriented with the first face 308 on a first plane and the rest of the battery cells may be oriented with their first face 308 on a second plane that is parallel to the first plane and separated from the first plane, such as illustrated in FIG. 3A. In this manner, some of the battery cells 220 are oriented in one direction while the rest of the battery cells 220 are oriented in a different direction. Electrical connections of some of the battery cells 220 will therefore be disposed on a first plane, while electrical connections of the other battery cells 220 will be disposed on a second plane.

As illustrated in FIG. 3B, the positive terminal 316 both the positive terminal 316 and the negative terminal 320 may be disposed on the first face 308. With this configuration, all of the battery cells 220 may be oriented with the first face 308 on the same plane, such as illustrated in FIG. 3B. In this manner, all of the battery cells 220 face the same direction and will be electrically connected on one plane.

Whether the battery cells 220 face the same direction or different directions enables different battery module configurations, connections of bus bars, and terminal locations on the battery modules.

Figure 4:
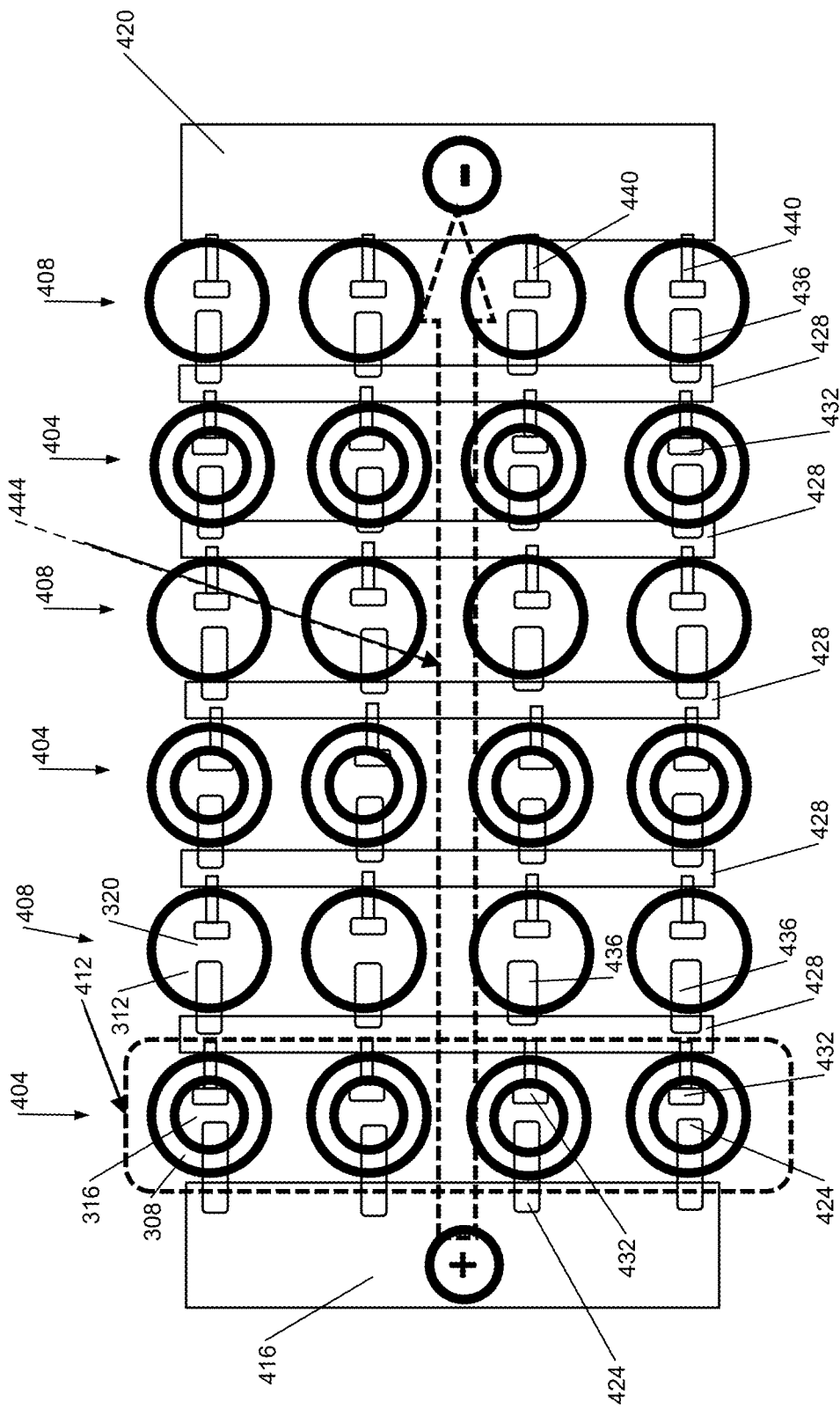
FIGS. 4 and 5 are top views of example battery modules with battery cells facing in different directions, such as illustrated in FIG. 3A.
Figure 5:
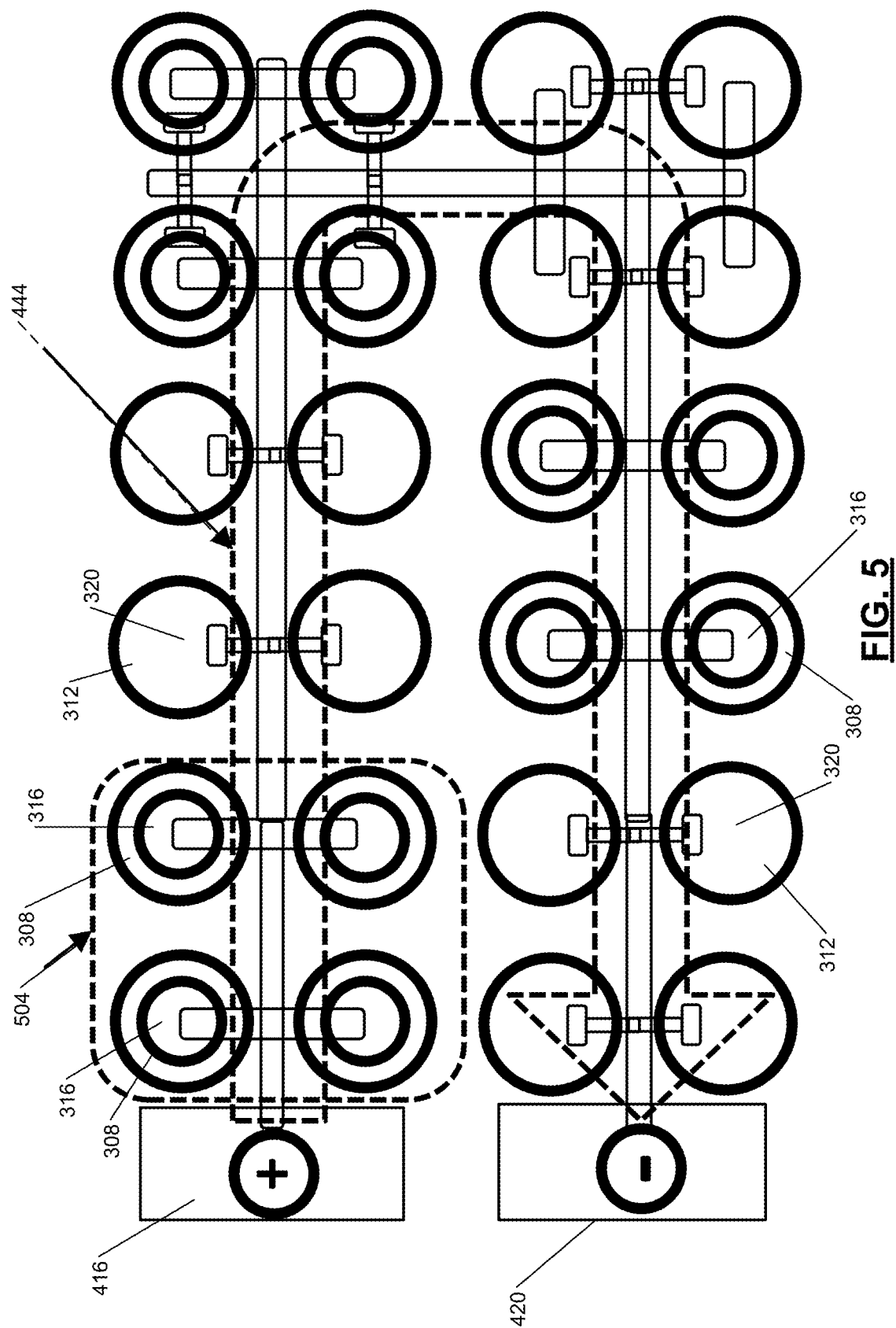

For example, FIGS. 4 and 5 are top views of example battery modules with battery cells facing in different directions (e.g., FIG. 3A). The positive terminals 316 are disposed on the first faces 308 of the battery cells 220, while the negative terminals 320 are disposed on the second faces 312 of the battery cells 220.

In FIG. 4, first rows 404 of the battery cells 220 face a first direction and have the positive terminals 316 facing the first direction. Second rows 408 of the battery cells 220 face a second direction that is opposite the first direction and have the negative terminals 320 facing the second direction. The first rows 404 and the second rows 408 alternate between first rows 404 and second rows 408 such that a first row 404 is disposed between two second rows 408 and a second row 408 is disposed between two first rows 404. While the example of four of the battery cells 220 being disposed in each row is provided, the present application is also applicable to other numbers of battery cells per row. The alignment of the battery cells in rows creates groups of battery cells that are electrically connected in parallel and arranged in a rectangular shape, as illustrated by 412 in the example of FIG. 4. Other groupings of batteries connected in parallel are also possible, such as square (e.g., 504 in FIG. 5), triangular, hexagonal, octagonal, or in another suitable shape.

Each battery module includes an electrically conductive positive terminal 416 and an electrically conductive negative terminal 420 disposed on an exterior housing of that battery module. The positive terminal 416 of one battery module can be electrically connected to the negative terminal 420 of another battery module to connect those two battery modules in series. The positive terminals 416 of two battery modules can be electrically connected and the negative terminals 420 can be electrically connected to connect those two battery modules in parallel. As shown in FIG. 4, the positive terminal 416 of a battery module may be disposed on a first side of the battery module and the negative terminal 420 of the battery module may be disposed on a second side of the battery module that is opposite the first side. This may be useful for a module arrangement such as 208 or 216. As illustrated by FIG. 5, the positive and negative terminals 416 and 420 of a battery module may be disposed on the same side of the battery module. This may be useful for a module arrangement such as 212.

Each battery module includes one or more electrically conductive bus bars. For example, bus bars 424 electrically connect the positive terminals 316 of the first row of battery cells 220 to the positive terminal 416 of the battery module. The bus bars 424 extend perpendicular to the rows of battery cells 220. Bus bar 428 extends parallel to the rows of battery cells. Bus bars 432 electrically connect the positive terminals 316 of one row of battery cells to the bus bar 428, and bus bars 436 electrically connect the negative terminals 420 of another row of battery cells to the bus bar 428. In this manner, the battery cells of one row are electrically connected in series with the battery cells of another row. The bus bars 432 and 436 extend perpendicular to the rows of battery cells 220. Not all of the bus bars are numbered for ease of viewing. Bus bars 440424 electrically connect the negative terminals 320 of the last row of the battery cells 220 to the negative terminal 420 of the battery module. Arrow 444 illustrates the direction of current flow.

As discussed above, FIG. 5 illustrates an example battery module with groups of battery cells of the same orientation (positive terminal up or negative terminal up) arranged in squares. Battery cell selection (terminals on only one face or one on each face), and shape of battery cell groups may be selected, such as to minimize battery module mass and volume and to minimize interconnect (bus bar) ohmic resistance within the battery module. The bus bars of each battery module may have minimal dimensions (length, width, thickness) to minimize mass.

Figure 6:
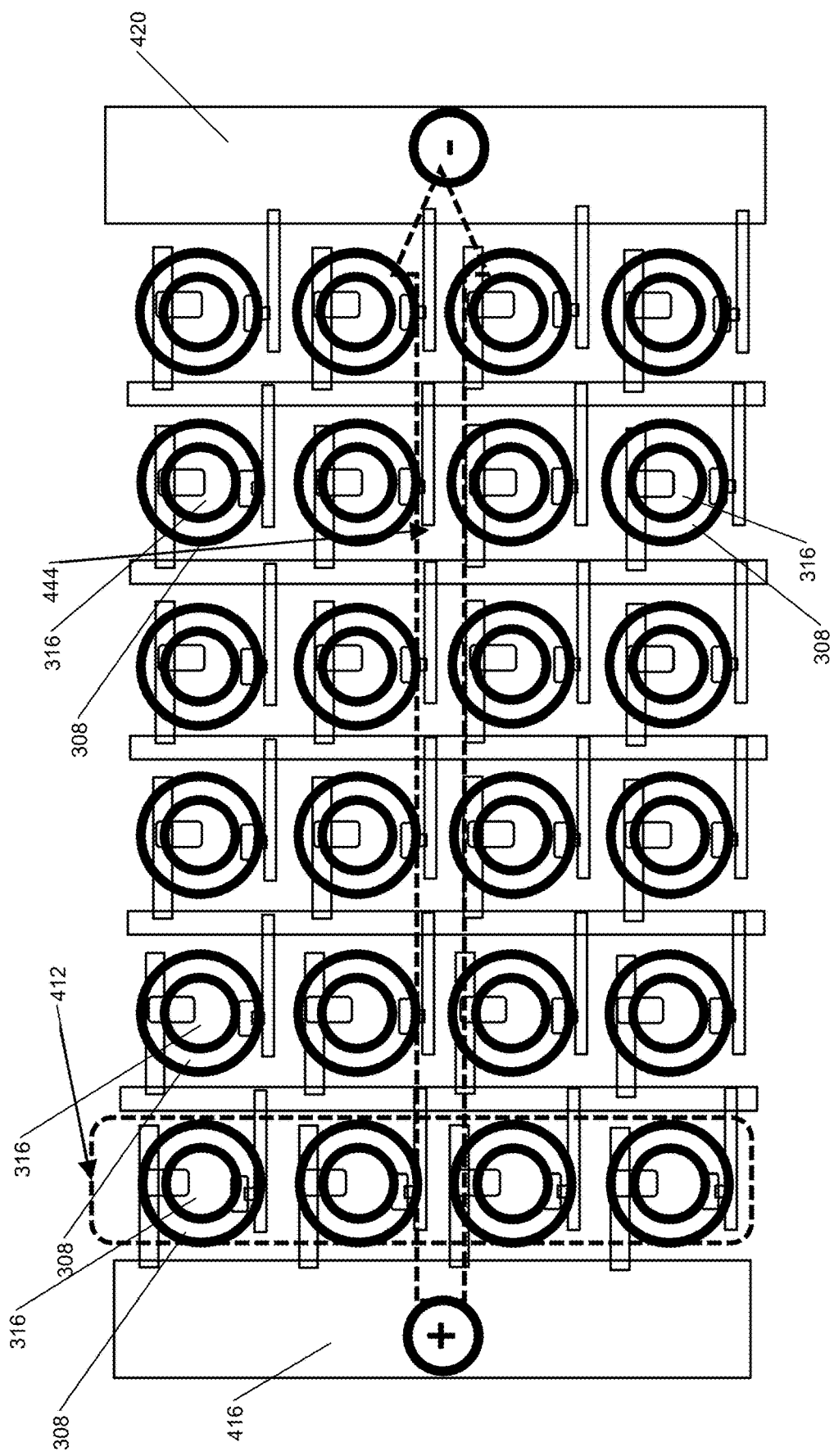
FIGS. 6 and 7 are top views of example battery modules with battery cells facing in the same direction, such as illustrated in FIG. 3B.
Figure 7:
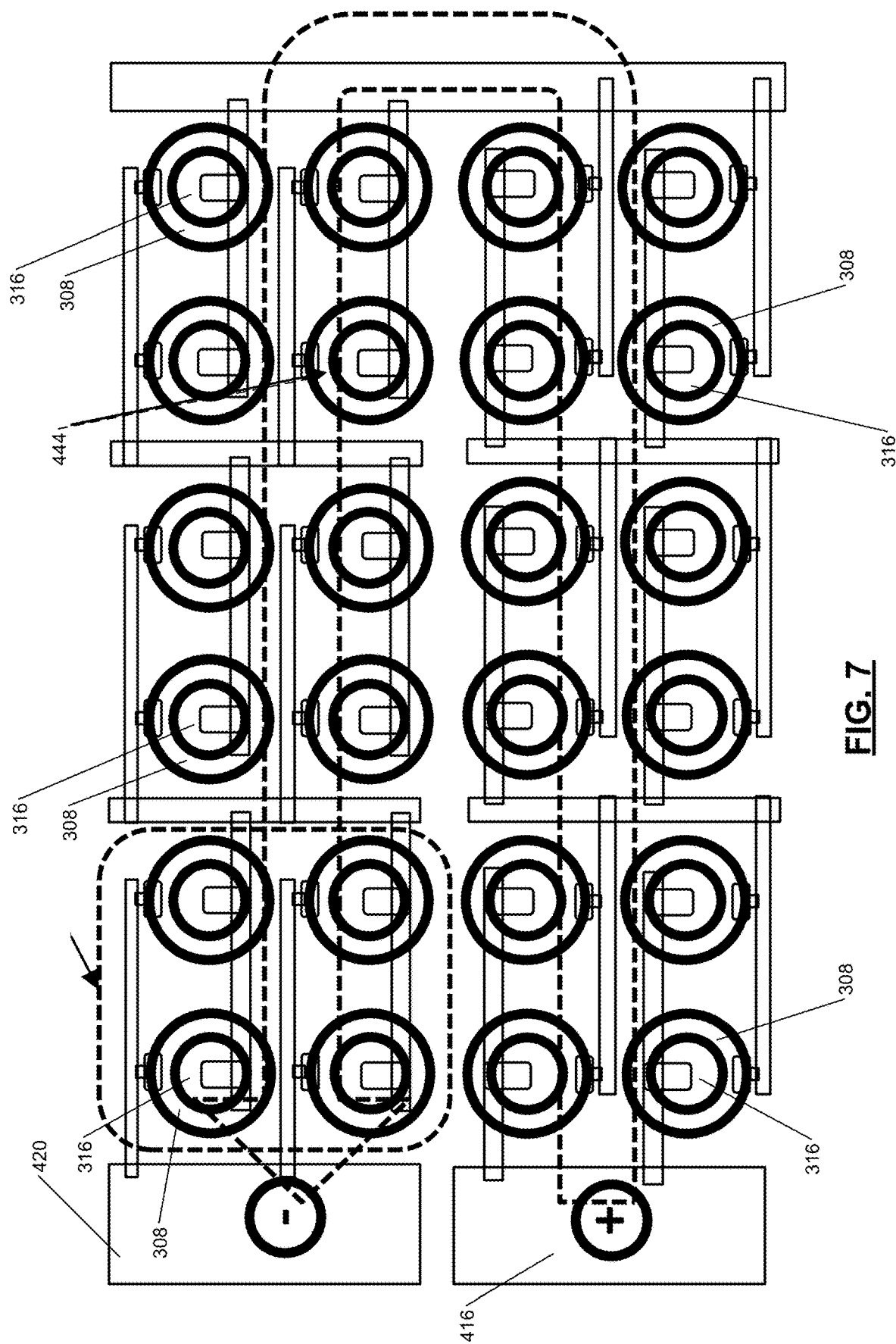

FIGS. 6 and 7 are top views of example battery modules with battery cells facing in the same direction (e.g., FIG. 3B). The positive terminals 316 and the negative terminals 320 are disposed on the first faces 308 of the battery cells 220. The groups of battery cells are arranged in rectangular shapes in rows in the example of FIG. 6. The groups of battery cells are arranged in square shapes in the example of FIG. 7.

Figure 8:
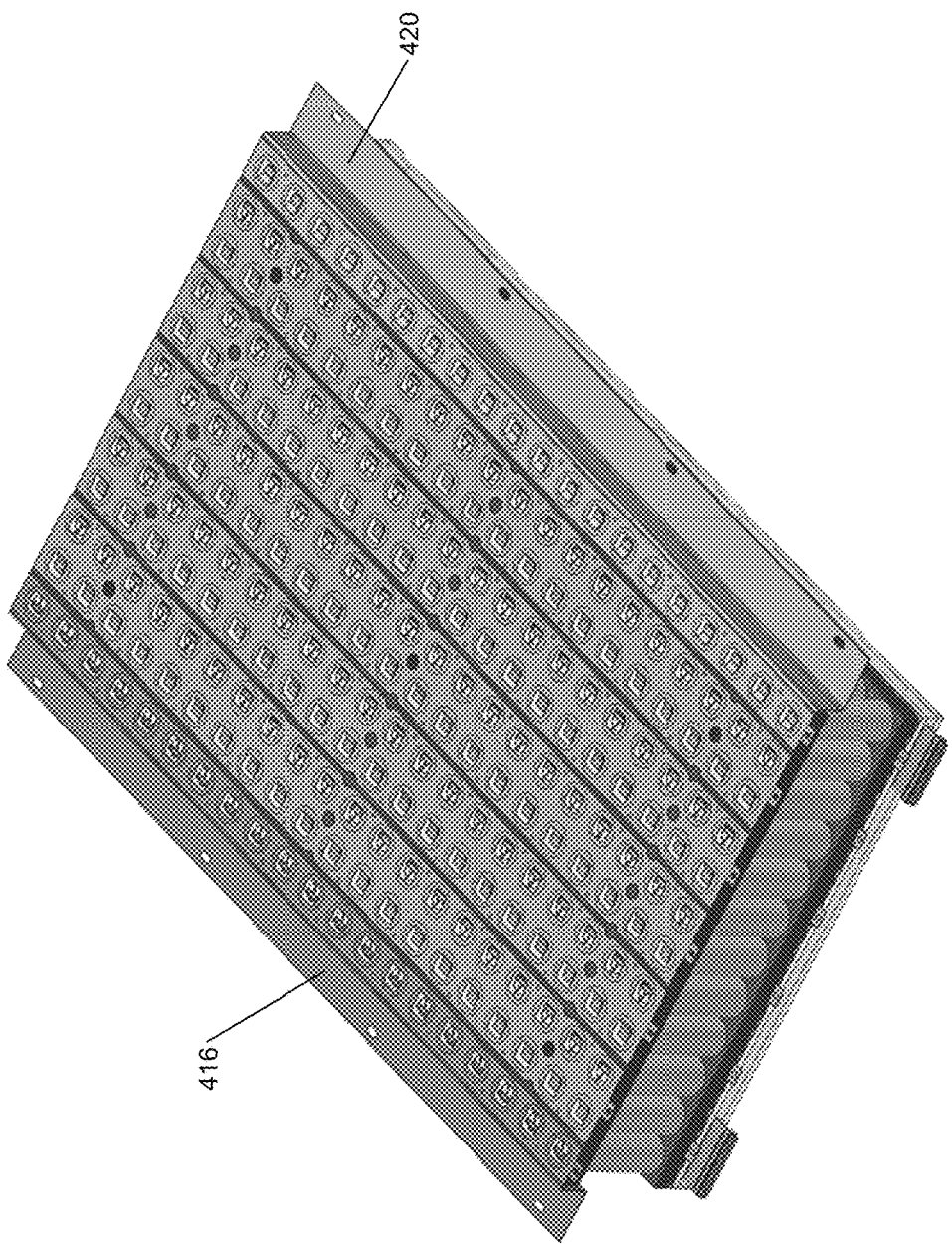
FIG. 8 is a perspective view of an example of the battery module of FIG. 4.
Figure 8:
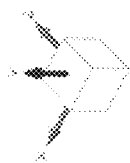
Figure 9:
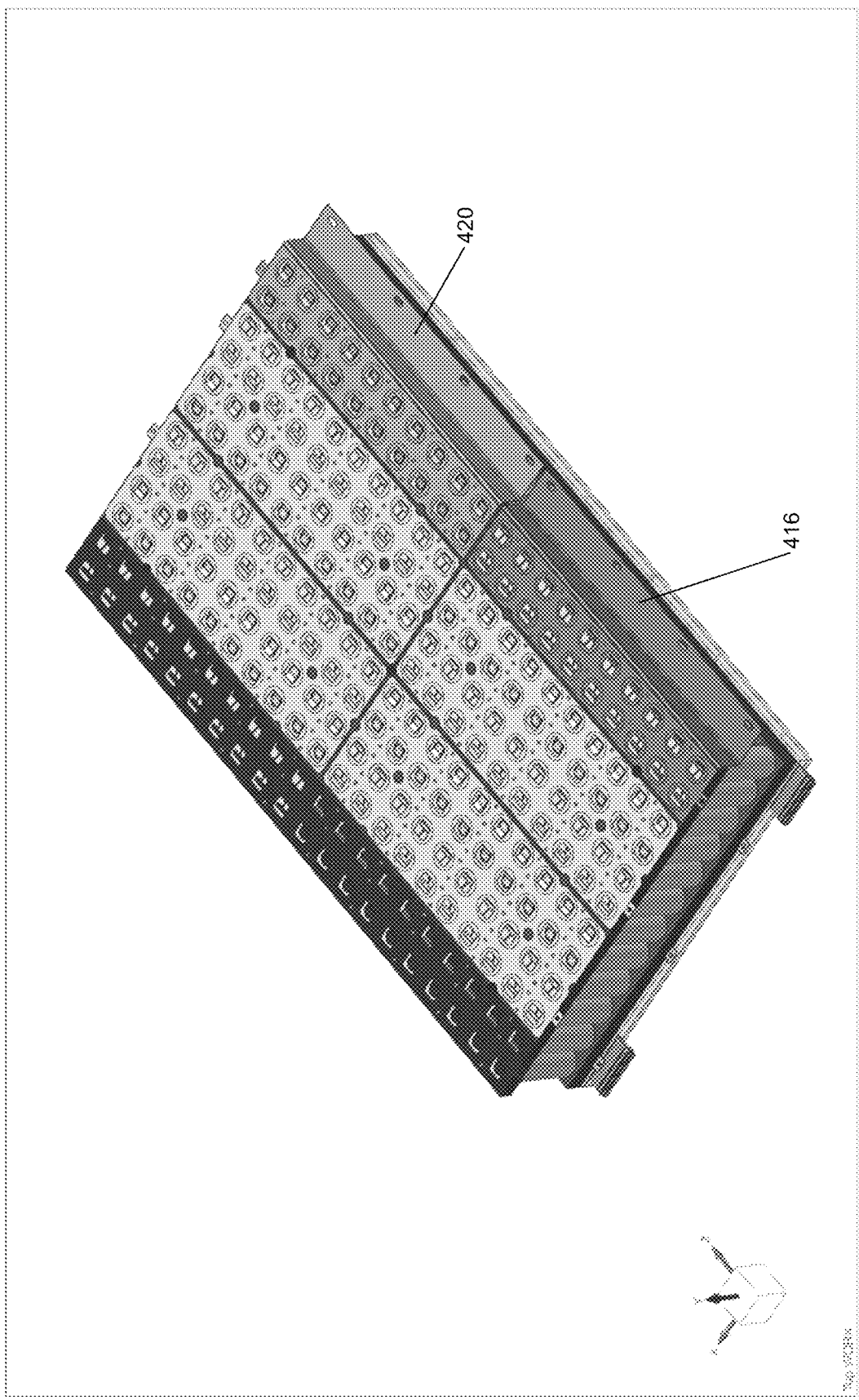
FIG. 9 is a perspective view of an example of the battery module of FIG. 5.
Figure 10:
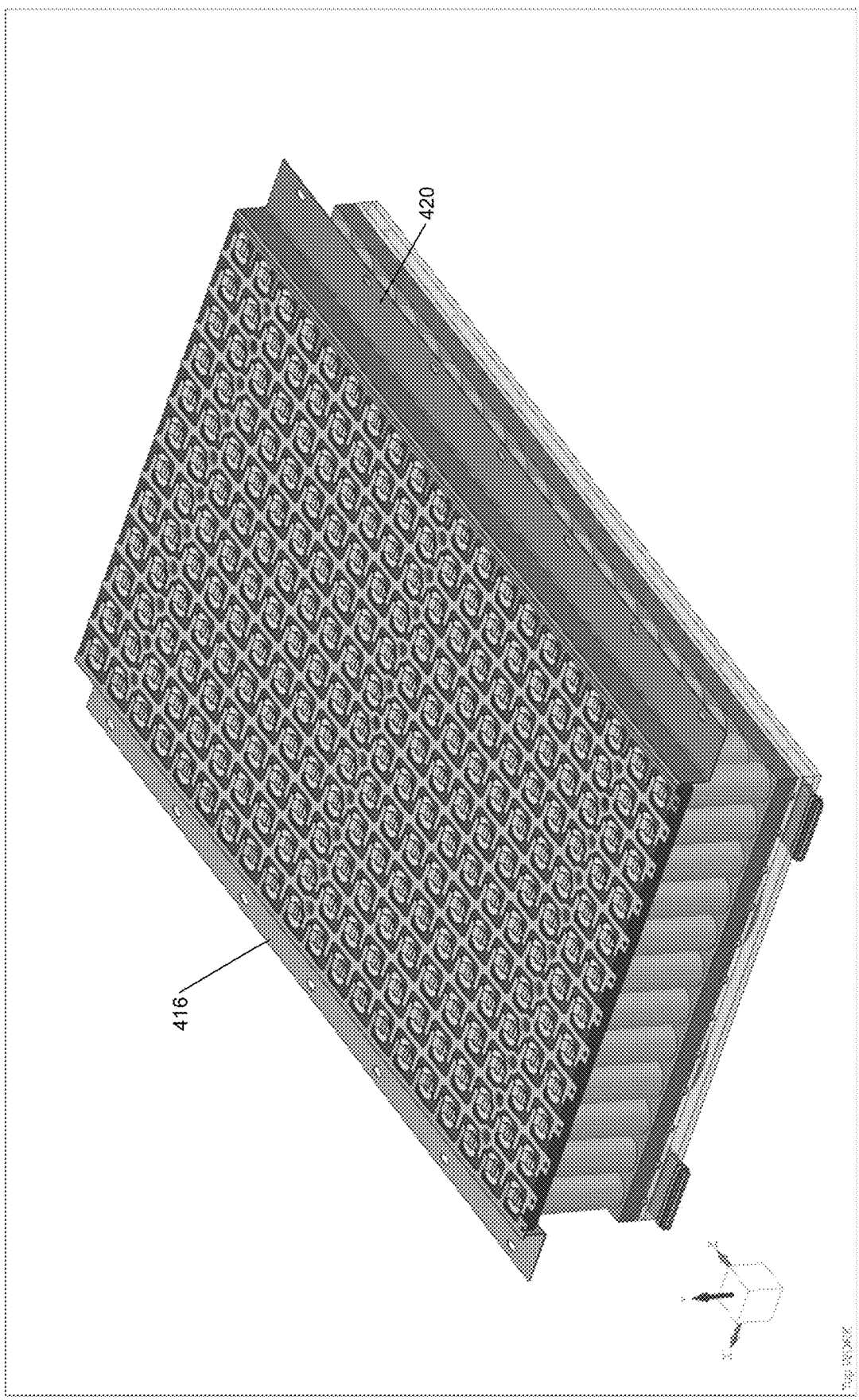
FIG. 10 is a perspective view of an example of the battery module of FIG. 6.
Figure 11:
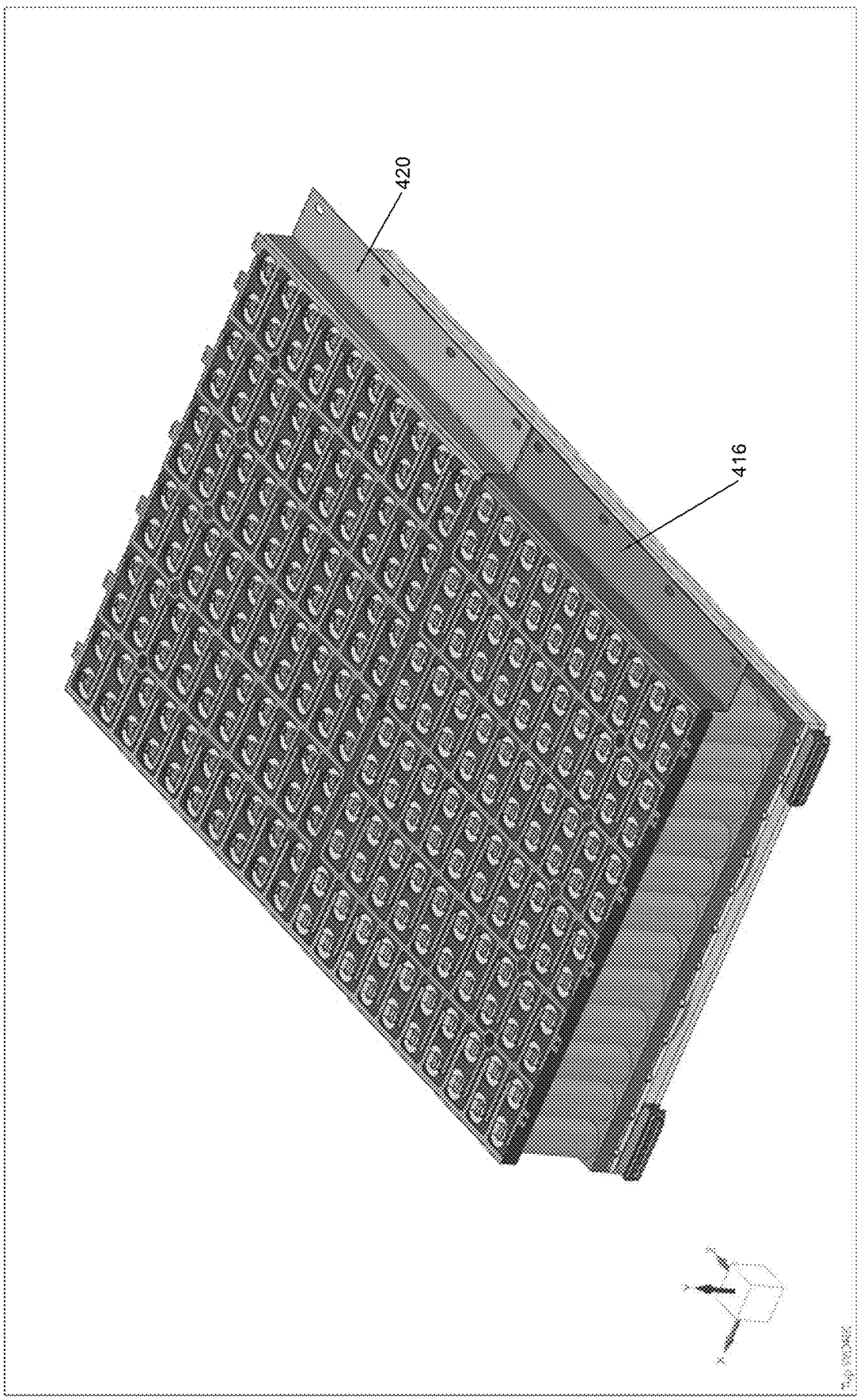
FIG. 11 is a perspective view of an example of the battery module of FIG. 7.

FIG. 8 is a perspective view of an example of the battery module of FIG. 4. FIG. 9 is a perspective view of an example of the battery module of FIG. 5. FIG. 10 is a perspective view of an example of the battery module of FIG. 6. FIG. 11 is a perspective view of an example of the battery module of FIG. 7.

Figure 12:
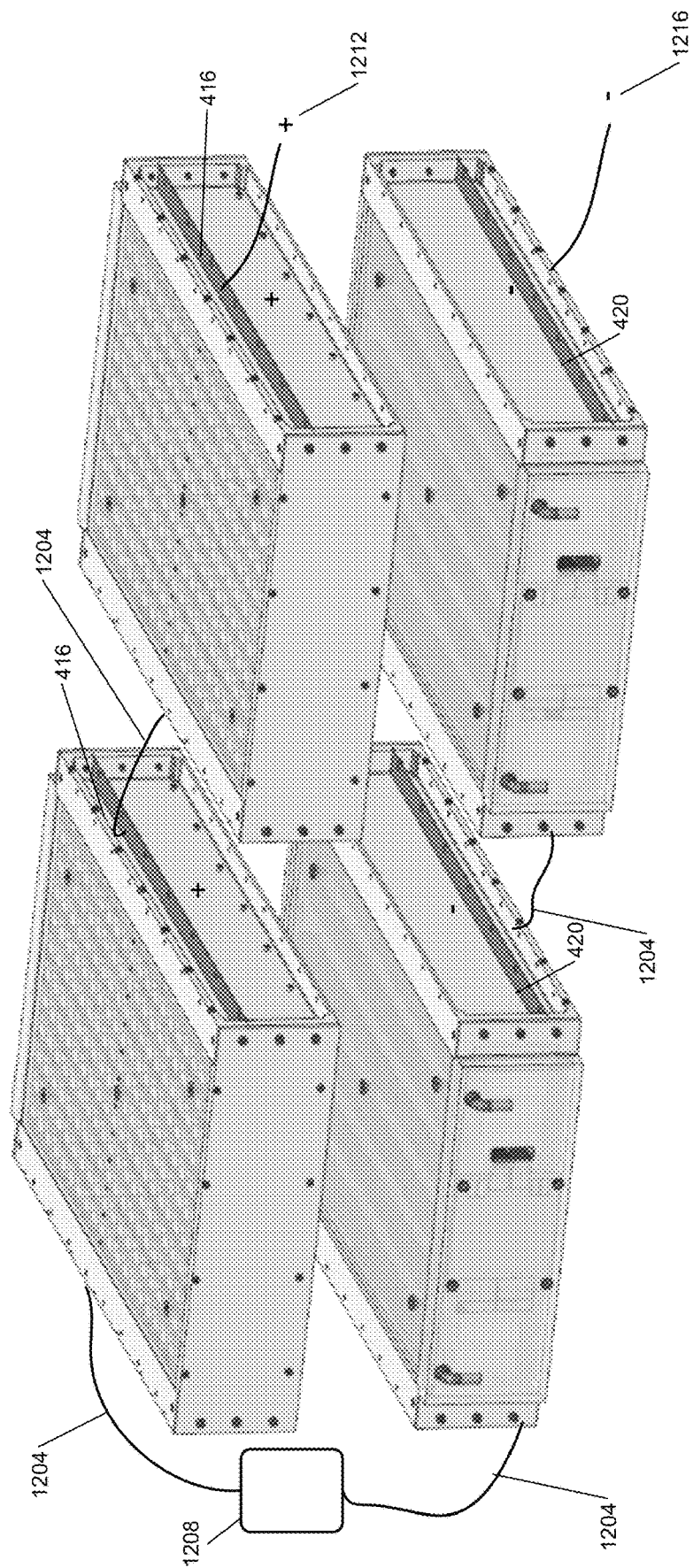
FIG. 12 is a perspective view including four battery modules of a battery pack.

FIG. 12 is a perspective view including four battery modules of a battery pack. The battery modules may be the battery modules of FIGS. 4 and 8. While the example of four battery modules is provided, the present application is applicable to other numbers of battery modules per battery pack. In the example of FIG. 12, the battery modules are connected in series such that the positive terminal 416 of one battery module is connected to the negative terminal 420 of the next battery module via an electrically conductive wire 1204. In various implementations, one or more fuses, such as fuse 1208, may be connected between two battery modules. The positive terminal 416 of a first one of the battery modules is electrically connected to an electrically conductive positive terminal 1212 of the battery pack. The negative terminal 420 of the last one of the battery modules is electrically connected to an electrically conductive negative terminal 1216 of the battery pack. While the example of series connected battery modules is provided, the present application is also applicable to battery packs with battery modules connected in parallel and battery packs with battery modules connected in series and battery modules connected in parallel. In the example of FIG. 12, the battery modules may be arranged all on one plane or some (e.g., half) of the battery modules may be stacked on others (e.g., half) of the battery modules such that the battery modules are arranged on two or more parallel planes.

Figure 13:
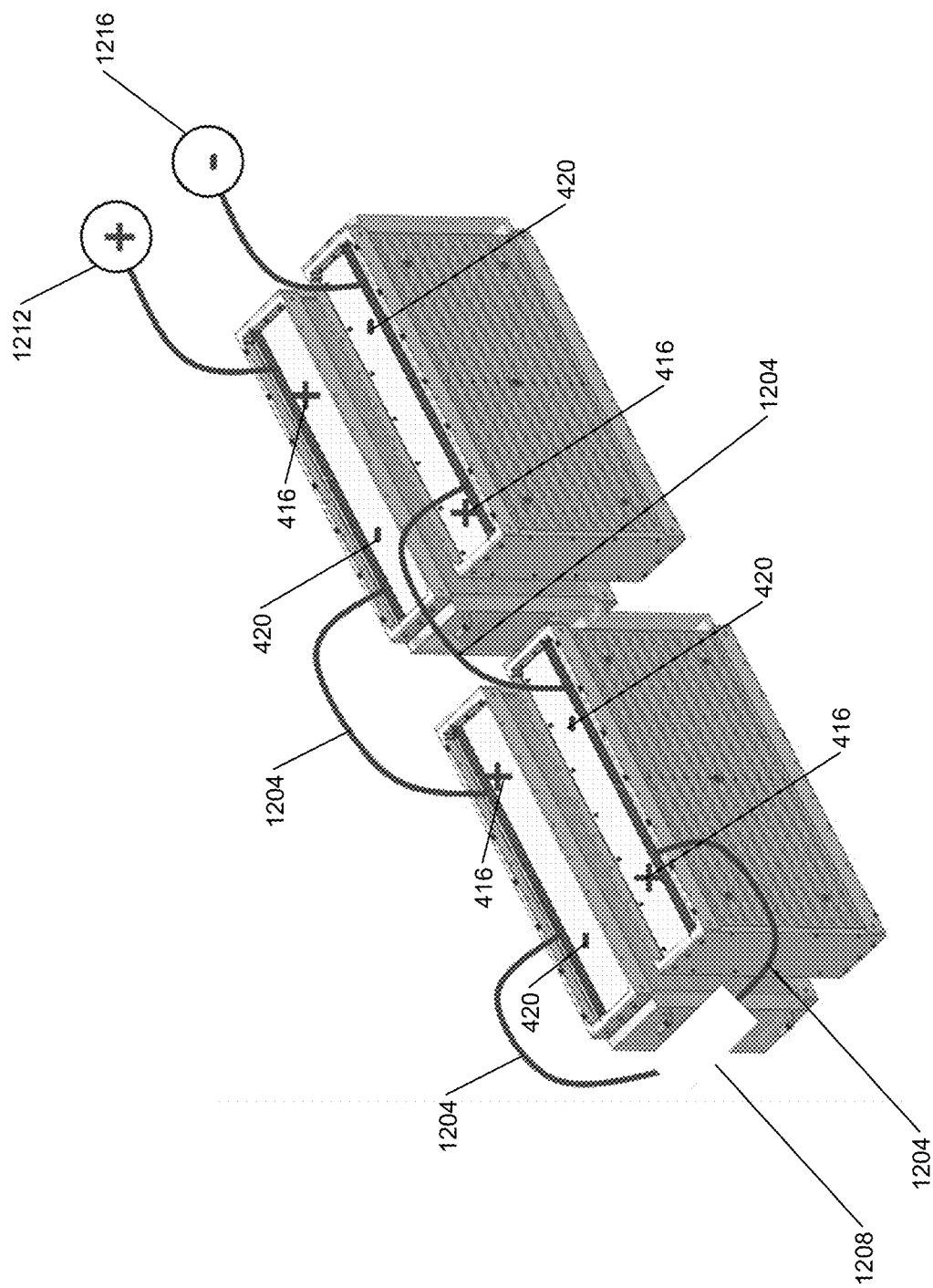
FIG. 13 is a perspective view of an example implementation involving battery modules arranged side by side.

FIG. 13 is a perspective view of an example implementation involving battery modules arranged side by side. For example, the battery modules may be the battery modules of the examples of FIGS. 5 and 9 with the positive and negative terminals 416 and 420 arranged on the same side of each battery module.

Figure 14:
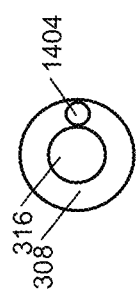
FIG. 14 is a perspective view of one of the battery cells toward the first face and the positive terminal.

FIG. 14 is a perspective view of one of the battery cells 220 toward the first face 308 and the positive terminal 316.

Each of the battery cells 220 includes a vent 1404. The vent 1404 may be disposed on the first face 308, such as near or on the positive terminal 316 of the battery cell 220. Gas and other ejecta may exit the battery cell 220 through the vent 1404 during normal operation and/or during a thermal event.

Figure 15:
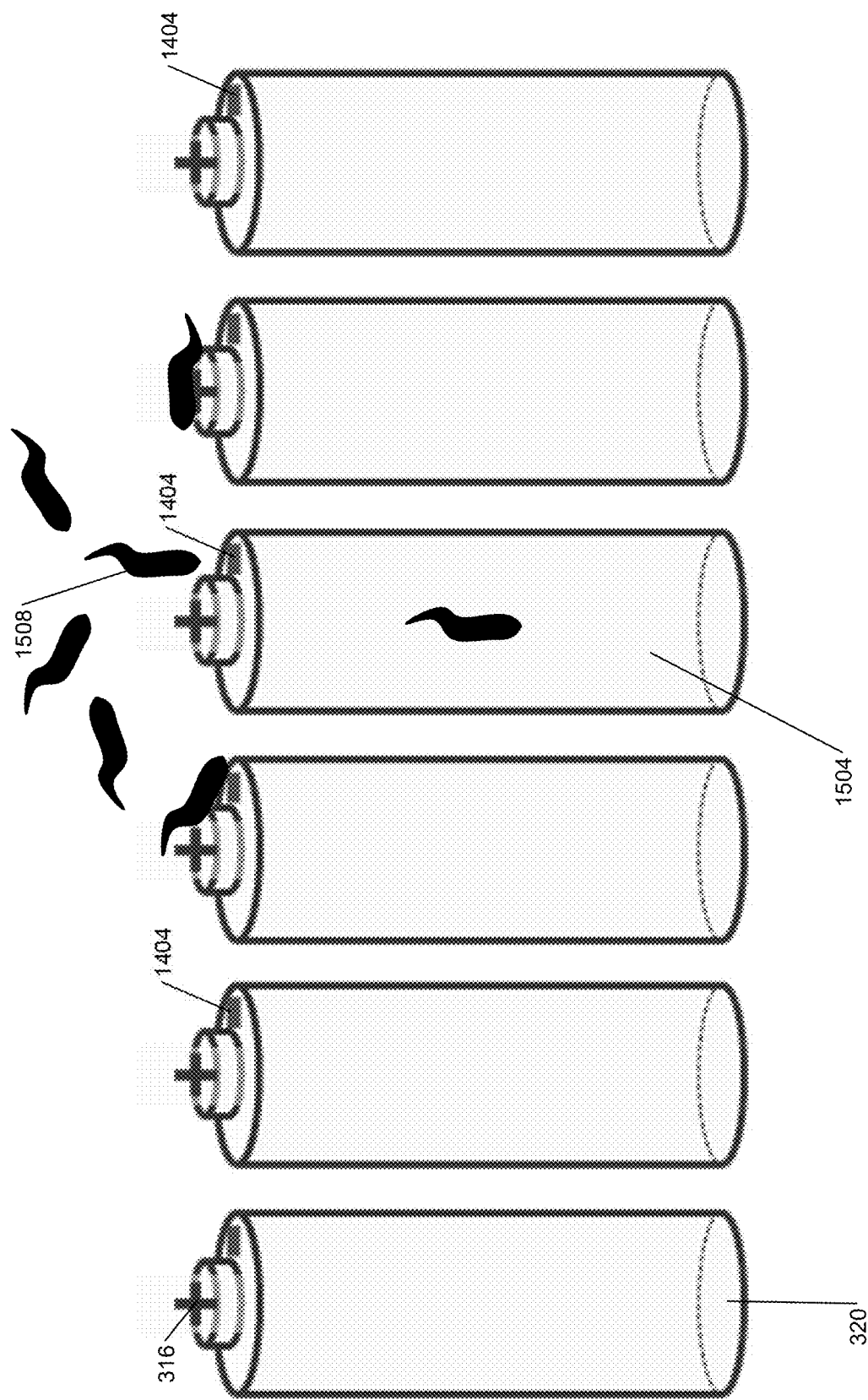
FIG. 15 includes an example side profile view of an example portion of a battery module.

FIG. 15 includes an example side profile view of an example portion of a battery module. When a thermal event occurs within one of the battery cells, such as battery cell 1504, gas and other ejecta 1508 from within the battery exits the vent 1404. Gas (without ejecta) may exit the vent 1404 during normal operation. The ejecta 1508 may have a high temperature, such as greater than 660 degrees Celsius in various implementations.

The ejecta 1508 may come into contact with one or more other battery cells of the battery module and cause those battery cells to sustain thermal events via ejecta from those battery cells. The thermal events of these battery cells may cause thermal events of other battery cells, etc.

Figure 16:
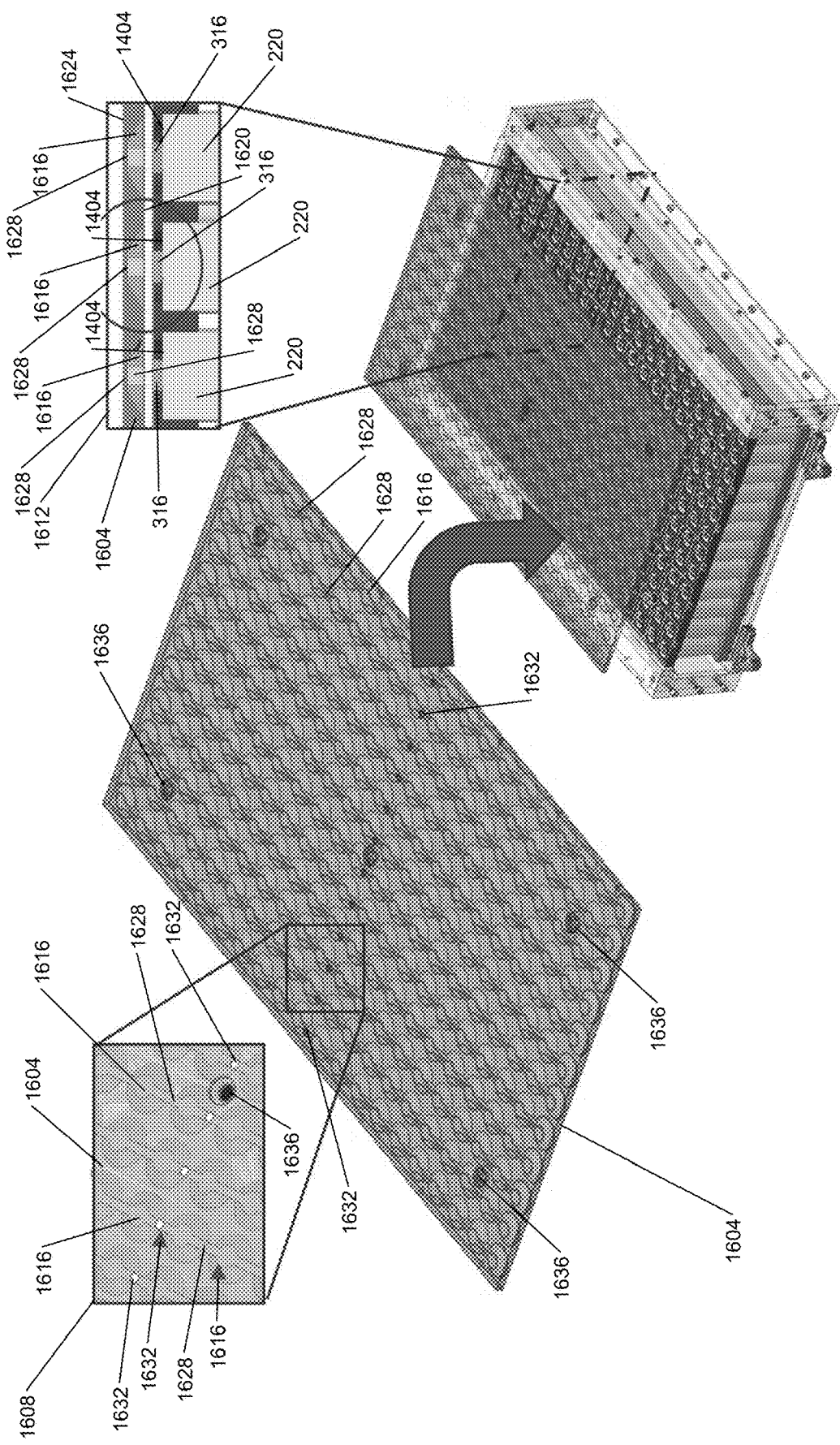
FIG. 16 is an exploded view of an example battery module including a thermal runaway protection (TRP) blanket.

FIG. 16 is an exploded view of an example battery module including a thermal runaway protection (TRP) blanket 1604. Each battery module may include one or more TRP blankets. For example, battery modules with all of the battery cells facing the same direction (e.g., such as FIG. 3B) may include one TRP blanket. Battery modules with some battery cells with positive terminals on a first plane and the rest of the battery cells with positive terminals on a second plane (e.g., such as in FIG. 3A) may include two TRP blankets—one on the first plane and one on the second plane. The TRP blanket 1604 is a thermally stable protective shield that helps keep ejecta from one battery cell away from other battery cells to prevent thermal runaway propagation within a battery module.

The TRP blanket 1604 is made of a thermally stable material, such as mica and/or one or more fiber materials. FIG. 16 also includes a zoomed in view 1608 on a portion of the TRP blanket 1604 and a cross-sectional view 1612 of a portion of the battery module and TRP blanket 1604. Thermally stable may mean not combusting when directly contacted by material that is less than a predetermined temperature, such as 700 degrees Celsius.

As illustrated in 1612, the TRP blanket 1604 includes one recessed portion 1616 for each of the battery cells 220. The recessed portions 1616 are recessed relative to a first planar face 1620 of the TRP blanket 1604. The TRP blanket 1604 also includes a second planar face 1624 that is opposite the first planar face 1620. The recessed portions 1616 are recessed relative to the first planar face 1620 and toward the second planar face 1624 but do not extend entirely to the second planar face 1624. The recessed portions 1616 form thinned portions 1628 that serve as sacrificial blow vents. The thinned portions 1628 may have a thickness of less than a predetermined thickness, such as 2.0 millimeters or another suitable thickness.

The first planar face 1620 of the TRP blanket 1604 directly contacts the first faces 308 of the battery cells 220. The positive terminals 316 of the battery cells 220 extend into the recessed portions 1616, respectively. As illustrated, the recessed portions 1616 may be frustoconical or have another suitable shape, such as cylindrical. The vents 1404 of the battery cells 220 are fluidly connected to an opening to the recessed portions 1616, respectively. The TRP blanket 1604 is illustrated as being separated from the battery cells 220 in view 1612 (in exploded form) but, as stated above, the first planar face 1620 of the TRP blanket 1604 directly contacts the first faces 308 of the battery cells 220.

The TRP blanket 1604 includes gas flow channels 1628 that extend in a first direction and fluidly connect rows (or lines) of the recessed portions 1616. The TRP blanket 1604 includes gas apertures 1632 that that are aligned in a second direction that may be perpendicular to the first direction. The gas apertures 1632 extend entirely through the TRP blanket 1604 from the first planar face 1620 to the second planar face 1624. The gas exiting the vents 1404 of the battery cells 220 during normal operation enter the recessed portions 1616 of the TRP blanket 1604. The gas travels through the gas flow channels 1628 to the gas apertures 1632 to vent from the battery module during normal operation.

During a thermal runaway event of a battery cell, pressure and/or ejecta from the battery cell creates an aperture through the thinned portion 1628 of that battery cell. The ejecta vents through the aperture through the thinned portion 1628. The ejecta may land on other portions of the TRP blanket 164, but the TRP blanket 164 prevents the ejecta from contacting neighboring battery cells and minimizes heat transfer from the ejecta to the neighboring battery cells. This minimizes a risk of additional battery cells experiencing thermal runaway events.

The TRP blanket 1604 also includes fastener apertures 1636 through which fasteners can extend to fasten a cooling plate (discussed below) to the battery module.

Figure 17:
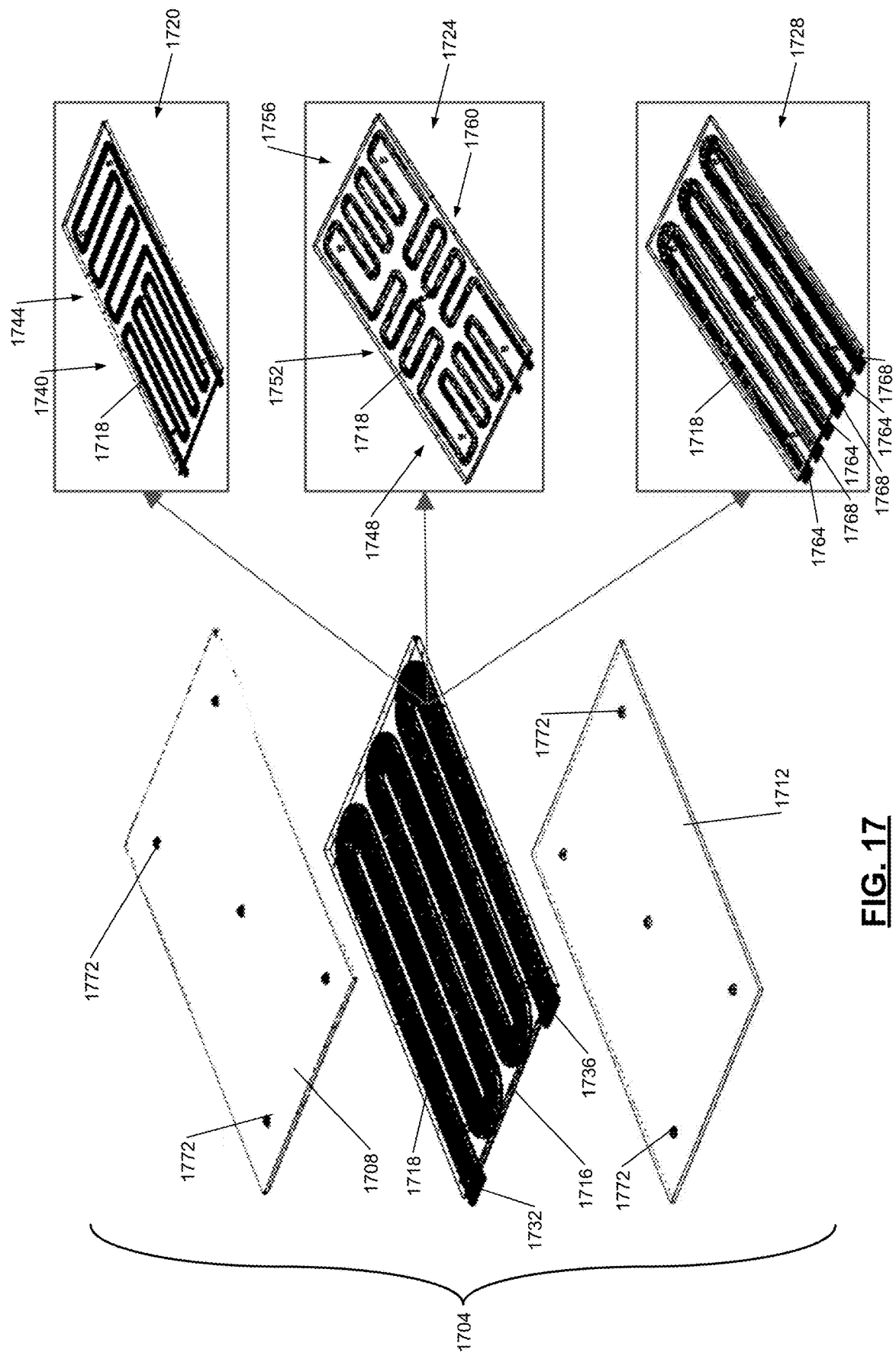
FIG. 17 includes an exploded view of an example implementation of a cooling plate of a battery module.

FIG. 17 includes an exploded view of an example implementation of a cooling plate 1704. The cooling plate 1704 includes top and bottom interface plates 1708 and 1712, respectively, and a coolant channel plate 1716. The plates 1704, 1708, and 1712 may be made of a thermally conductive material, such as aluminum, copper, or another suitable material. The plates 1704, 1708, and 1712 may have a thermal conductivity that is greater than or equal to a predetermined thermal conductivity. The predetermined thermal conductivity may be, for example, 75, 100, 150, or 200 W m$^{-1}$ K$^{-1}$ at 20 degrees Celsius and 1 bar, or another suitable predetermined thermal conductivity.

Each battery module may include one or more cooling plates. For example, battery modules with all of the battery cells facing the same direction (e.g., such as FIG. 3B) may include one cooling plate 1704 with the bottom interface plate 1708 directly contacting the second planar face of the TRP blanket. Battery modules with some battery cells with positive terminals on a first plane and the rest of the battery cells with positive terminals on a second plane (e.g., such as in FIG. 3A) may include two cooling plates, one directly contacting the TRP blanket on the first plane and one directly contacting the TRP blanket on the second plane. The coolant channel plate 1716 is sandwiched (disposed directly) between the top and bottom interface plates 1708 and 1712.

A fluid (e.g., water, engine coolant, a gas, etc.) flows through one or more coolant channels 1718 through the coolant channel plate 1716. The cooling plate 1704 transfers heat from the coolant to the battery module for warming of the battery module or from the battery module to the coolant for cooling of the battery module.

FIG. 17 also includes perspective views of various example implementations of the coolant channel plate 1716 including 1720, 1724, and 1728. Arrangement of the coolant channels 1718 of the coolant channel plate 1716 may be selected based on the arrangement and electrical connection of the battery cells 220 within the battery module to provide more heating and cooling at some locations and less heating and cooling at other locations.

As illustrated by 1716, the coolant channel plate 1716 may include one coolant inlet 1732 and one coolant outlet 1736 and one continuous coolant channel formed therebetween. The fluid flows into the coolant channel 1718 via the coolant inlet 1732 and flows out of the coolant channel 1718 via the coolant outlet 1736. The coolant channel 1718 may extend in a serpentine shape as illustrated by 1716 where coolant flows in a first direction, turns 180 degrees and flows in a second direction, turns 180 degrees to again flow in the first direction, etc. With this configuration, the coolant inlet 1732 may be disposed near a first lateral side of the coolant channel plate 1716 and the coolant outlet 1736 may be disposed near a second lateral side of the coolant channel plate 1716 that is opposite the first lateral side.

The example of 1720 illustrates an example of the coolant channel 1718 having a first serpentine shaped portion 1740 and a second serpentine shaped portion 1744. In the first serpentine shaped portion 1740, coolant flows in a first direction, turns 180 degrees relative to the first direction and flows in a second direction, turns 180 degrees relative to the second direction to again flow in the first direction, etc. In the second serpentine shaped portion 1744, coolant flows in a third direction that is 90 degrees from one of the first direction and the second direction, turns 180 degrees relative to the third direction and flows in a fourth direction, turns 180 degrees relative to the fourth direction to again flow in the third direction, etc. With this configuration, the coolant inlet 1732 may be disposed near the first lateral side of the coolant channel plate 1716 and the coolant outlet 1736 may be disposed near the second lateral side of the coolant channel plate 1716 that is opposite the first lateral side.

The example of 1724 illustrates an example of the coolant channel 1718 having a first serpentine shaped portion 1748, a second serpentine shaped portion 1752, a third serpentine shaped portion 1756, and a fourth serpentine shaped portion 1760. In the first serpentine shaped portion 1748, coolant flows in a first direction, turns 180 degrees relative to the first direction and flows in a second direction, turns 180 degrees relative to the second direction to again flow in the first direction, etc. In the second serpentine shaped portion 1752, coolant flows in a third direction that is 90 degrees from one of the first direction and the second direction, turns 180 degrees relative to the third direction and flows in a fourth direction, turns 180 degrees relative to the fourth direction to again flow in the third direction, etc. In the third serpentine shaped portion 1756, coolant flows in a fifth direction that is 90 degrees from one of the third and fourth directions, turns 180 degrees relative to the fifth direction and flows in a sixth direction, turns 180 degrees relative to the sixth direction to again flow in the fifth direction, etc. The fifth and sixth directions may be parallel to or the same direction as the first and second directions, respectively. In the fourth serpentine shaped portion 1760, coolant flows in a seventh direction that is 90 degrees from one of the fifth and sixth directions, turns 180 degrees relative to the seventh direction and flows in an eighth direction, turns 180 degrees relative to the eighth direction to again flow in the seventh direction, etc. The seventh and eighth directions may be parallel to or the same direction as the third and fourth directions, respectively. With this configuration, the coolant inlet 1732 may be disposed near the first lateral side of the coolant channel plate 1716 and the coolant outlet 1736 may be disposed near the second lateral side of the coolant channel plate 1716 that is opposite the first lateral side. While examples of one, two, and four serpentine shaped portions are provided, the present application is also applicable to the coolant channel plate 1716 including other suitable numbers of serpentine shaped portions of coolant channel(s).

In the example of 1728, the coolant channel plate 1716 may include multiple coolant inlets 1764 and multiple coolant outlets 1768 and multiple different coolant channels 1718 each connecting one coolant inlet 1764 with one coolant outlet 1768. The fluid flows into the coolant channels 1718 via a coolant inlet 1764 and flows out of the coolant channels 1718 via a coolant outlet 1768. Each of the coolant channels 1718 may have a U shape as illustrated where coolant flows from a coolant inlet 1764 in a first direction, turns 180 degrees and flows in a second direction to a coolant outlet 1768. The coolant inlets 1764 may be fluidly connected to a first manifold, and the coolant outlets 1764 may be fluidly connected to a second manifold.

In various implementations one or more flow control valves may be disposed at one or more locations within the coolant channel(s) 1718. The flow control valves regulate fluid flow within the coolant channel(s) 1718. The flow control valves may be thermostatic valves that open and close based on coolant temperature or actively controlled valves.

The cooling plate 1704 also includes fastener apertures 1772 that are aligned with the fastener apertures 1636 of the TRP blanket 1604. Fasteners (e.g., bolts) extend through the cooling plate 1704 and the TRP blanket 1604 and fasten the cooling plate 1704 and the TRP blanket 1604 to the battery module.

Figure 18:
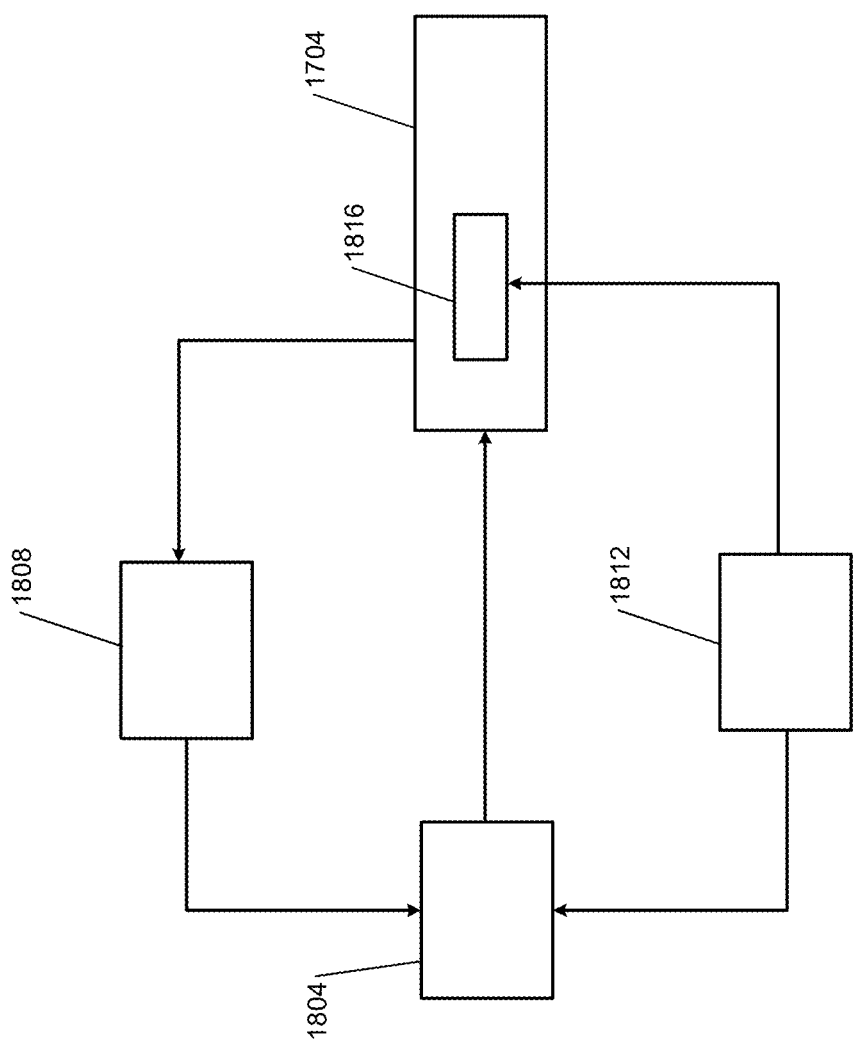
FIG. 18 is a functional block diagram of an example temperature control system for a battery module.

FIG. 18 is a functional block diagram of an example temperature control system for a battery module. The cooling plate 1704 may be fastened to a battery module as discussed above. A pump 1804 includes an electric motor and pumps coolant to the cooling plate 1704. The pump 1804 draws coolant from a heat exchanger 1808. The heat exchanger 1808 transfers heat (a) from air passing the heat exchanger 1808 to coolant flowing through the heat exchanger 1808 or (b) from coolant flowing through the heat exchanger 1808 to air passing the heat exchanger 1808. A blower or fan may be implemented to increase airflow past the heat exchanger 1808.

A temperature control module 1812 may control operation of the pump 1804, such as whether the pump 1804 is on or off. In various implementations, the pump 1804 may be a variable speed pump and the temperature control module 1812 may control a speed of the pump 1804.

In the example of the flow control valves 1816 of the cooling plate 1704 being actively controlled valve, the temperature control module 1812 may control actuation of the flow control valves 1816, such as based on temperature of coolant at one or more locations within the cooling plate 1704.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A battery module, comprising:
   a positive terminal disposed on an exterior of a housing of the battery module;
   a negative terminal disposed on the exterior of the housing of the battery module;
   groups of two or more cylindrical battery cells electrically connected in parallel;
   electrically conductive bus bars that electrically connect the groups in series, that electrically connect positive terminals of the cylindrical battery cells of a first one of the groups with the positive terminal of the battery module, and that electrically connect negative terminals of the cylindrical battery cells of a second one of the groups with the negative terminal of the battery module;
   a cooling plate having a first side that faces the groups and a second side opposite the first side that faces away from the groups; and
   a thermal runaway protection blanket that is sandwiched directly between (a) the first side of the cooling plate and (b) the groups, the thermal runaway protection blanket including a surface that faces the groups,
   wherein the surface of the thermal runaway protection blanket that faces the groups includes recessed portions that directly contact the groups and face vents of the battery cells of the groups.

2. The battery module of claim 1 wherein:
   the positive terminals of all of the cylindrical battery cells of the groups are disposed on a first plane and face a first direction; and
   the negative terminals of all of the cylindrical battery cells of the groups are disposed on a second plane that is parallel to the first plane and face a second direction that is opposite the first direction.

3. The battery module of claim 2 wherein the groups of two or more cylindrical battery cells form a rectangle shape.

4. The battery module of claim 3 wherein the electrically conductive bus bars include electrically conductive bus bars that extend between two of the groups and that electrically connect the negative terminals of a first one of the two groups with the positive terminals of a second one of the two groups.

5. The battery module of claim 3 wherein:
   the positive terminal of the battery module is disposed on a first side of the battery module;
   the negative terminal of the battery module is disposed on a second side of the battery module; and
   the second side is opposite the first side.

6. The battery module of claim 2 wherein the groups of two or more cylindrical battery cells form a square shape.

7. The battery module of claim 6 wherein the electrically conductive bus bars include electrically conductive bus bars that extend between two of the groups and that electrically connect the negative terminals of a first one of the two groups with the positive terminals of a second one of the two groups.

8. The battery module of claim 6 wherein:
   the positive terminal of the battery module is disposed on a first side of the battery module; and
   the negative terminal of the battery module is disposed on the first side of the battery module.

9. The battery module of claim 1 wherein:
   the positive terminals of a first portion of the cylindrical battery cells of the groups are disposed on a first end of the cylindrical battery cells;
   the positive terminals of a second portion of the cylindrical battery cells of the groups are disposed on a second end of the cylindrical battery cells that is opposite the first end;
   the negative terminals of the first portion of the cylindrical battery cells of the groups are disposed on the second end of the cylindrical battery cells; and
   the negative terminals of the second portion of the cylindrical battery cells of the groups are disposed on the first end of the cylindrical battery cells.

10. The battery module of claim 9 wherein the groups of two or more cylindrical battery cells form a rectangle shape.

11. The battery module of claim 10 wherein the electrically conductive bus bars include electrically conductive bus bars that extend between two of the groups and that electrically connect the negative terminals of a first one of the two groups with the positive terminals of a second one of the two groups.

12. The battery module of claim 10 wherein:
the positive terminal of the battery module is disposed on a first side of the battery module;
the negative terminal of the battery module is disposed on a second side of the battery module; and
the second side is opposite the first side.

13. The battery module of claim 9 wherein the groups of two or more cylindrical battery cells form a square shape.

14. The battery module of claim 13 wherein the electrically conductive bus bars include electrically conductive bus bars that extend between two of the groups and that electrically connect the negative terminals of a first one of the two groups with the positive terminals of a second one of the two groups.

15. The battery module of claim 13 wherein:
the positive terminal of the battery module is disposed on a first side of the battery module; and
the negative terminal of the battery module is disposed on the first side of the battery module.

16. A battery pack comprising:
at least two of the battery modules of claim 1; and
electrical conductors electrically connecting the at least two battery modules in series,
wherein the positive terminals of the at least two battery modules are arranged on first sides of the at least two battery modules, respectively,
wherein the negative terminals of the at least two battery modules are arranged on second sides of the at least two battery modules, respectively,
wherein the second sides of the at least two battery modules are opposite the first sides of the respective at least two battery modules.

17. The battery pack of claim 16 wherein a first one of the at least two battery modules is disposed on top of a second one of the at least two battery modules.

18. The battery pack of claim 16 wherein a first one of the at least two battery modules is disposed beside a second one of the at least two battery modules.

19. A battery pack comprising:
at least two of the battery modules of claim 1; and
electrical conductors electrically connecting the at least two battery modules in series,
wherein the positive terminals of the at least two battery modules are arranged on first sides of the at least two battery modules, respectively, and
wherein the negative terminals of the at least two battery modules are arranged on the first sides of the at least two battery modules, respectively.

20. The battery pack of claim 19 wherein a first one of the at least two battery modules is disposed beside a second one of the at least two battery modules.

* * * * *